(12) United States Patent
Sack et al.

(10) Patent No.: US 10,589,643 B2
(45) Date of Patent: Mar. 17, 2020

(54) CHILD SAFETY SEAT INCLUDING A REMOVABLE BELT-POSITIONING SEAT

(71) Applicant: Wonderland Switzerland AG, Steinhausen (CH)

(72) Inventors: Daniel A. Sack, Pottstown, PA (US); Curtis M. Hartenstine, Birdsboro, PA (US); Ryan N. Miller, Lancaster, PA (US); John Huntley, Philadelphia, PA (US)

(73) Assignee: Wonderland Switzerland AG, Steinhausen (CH)

( * ) Notice: Subject to any disclaimer, the term of this patent is extended or adjusted under 35 U.S.C. 154(b) by 112 days.

(21) Appl. No.: 15/870,147

(22) Filed: Jan. 12, 2018

(65) Prior Publication Data
US 2018/0194252 A1    Jul. 12, 2018

Related U.S. Application Data

(60) Provisional application No. 62/445,392, filed on Jan. 12, 2017.

(51) Int. Cl.
*B60N 2/28* (2006.01)
(52) U.S. Cl.
CPC ......... *B60N 2/2812* (2013.01); *B60N 2/2806* (2013.01); *B60N 2/2866* (2013.01);
(Continued)

(58) Field of Classification Search
None
See application file for complete search history.

(56) References Cited

U.S. PATENT DOCUMENTS

| | | | | |
|---|---|---|---|---|
| 5,496,092 A | * | 3/1996 | Williams | A61F 5/3792 297/250.1 |
| 5,671,971 A | * | 9/1997 | Koyanagi | B60N 2/2806 297/250.1 |

(Continued)

FOREIGN PATENT DOCUMENTS

| | | | | |
|---|---|---|---|---|
| DE | 10306341 B4 | | 6/2012 | |
| EP | 1199213 A1 | * | 4/2002 | ......... B60N 2/2806 |

(Continued)

OTHER PUBLICATIONS

Combined Search and Examination Report dated Jul. 11, 2018 in co-pending British Patent Appl. No. 1800539.7.
(Continued)

*Primary Examiner* — David E Allred
(74) *Attorney, Agent, or Firm* — NZ Carr Law Office

(57) ABSTRACT

A child safety seat includes a seat base and a belt-positioning seat. The seat base has a bottom surface suitable for placement on a vehicle seat, and two armrests protruding upward from an upper surface of the seat base. The belt-positioning seat is installable in a receiving region of the seat base between the two armrests and removable therefrom for independent use, the belt-positioning seat including a seat body having a bottom surface adapted to be placed on a vehicle seat, and a belt guide connected with the seat body, the belt guide having a deployed position protruding upward from the seat body and a storage position stowed in a storage cavity in the seat body, the belt-positioning seat being placed in the receiving region of the seat base with the belt guide in the storage position.

13 Claims, 14 Drawing Sheets

(52) U.S. Cl.
CPC ............... *B60N 2002/2815* (2013.01); *B60N 2002/2818* (2013.01)

(56) References Cited

U.S. PATENT DOCUMENTS

| | | | | |
|---|---|---|---|---|
| 5,915,787 | A * | 6/1999 | Brookman | ........... B60N 2/2806 297/256.13 |
| 6,193,312 | B1 | 2/2001 | Yoshida et al. | |
| 9,233,630 | B2 * | 1/2016 | Amirault | ............... B60N 2/2866 |
| 2001/0011838 | A1 * | 8/2001 | Kassai | ................. B60N 2/2839 297/250.1 |
| 2004/0239166 | A1 | 12/2004 | Kihlberg et al. | |
| 2004/0245822 | A1 | 12/2004 | Balensiefer, II et al. | |
| 2004/0262966 | A1 | 12/2004 | Hosoya | |
| 2010/0176635 | A1 | 7/2010 | Glance | |
| 2011/0133533 | A1 | 6/2011 | Herzberg | |
| 2012/0175922 | A1 | 7/2012 | Gillett et al. | |
| 2012/0280553 | A1 * | 11/2012 | Barker | ................. B60N 2/2803 297/452.1 |
| 2013/0200671 | A1 | 8/2013 | Herzberg | |
| 2017/0282758 | A1 | 10/2017 | Mitchell | |

FOREIGN PATENT DOCUMENTS

| | | | | |
|---|---|---|---|---|
| EP | 1943125 | B1 | 6/2011 | |
| GB | 2414662 | A * | 12/2005 | ........... B60N 2/0284 |
| JP | 2000-071829 | A | 3/2000 | |
| JP | 2001-146122 | A | 5/2001 | |
| JP | 2014-028305 | A | 2/2014 | |
| WO | 2006030243 | A2 | 3/2006 | |
| WO | 2012053420 | A1 | 4/2012 | |
| WO | WO-2016190605 | A1 * | 12/2016 | ............... B60N 2/26 |

OTHER PUBLICATIONS

The Examination Report from co-pending AU Patent Application No. 201800251 dated Nov. 30, 2018.

Office Action issued by the Japanese Patent Office dated Jan. 8, 2019 in connection with Japanese patent application No. 2018-003320.

* cited by examiner

CHILD SAFETY SEAT INCLUDING A REMOVABLE BELT-POSITIONING SEAT

CROSS-REFERENCE TO RELATED APPLICATION(S)

This application claims priority to US Provisional Patent Application No. 62/445,392 filed on Jan. 12, 2017, which is incorporated herein by reference.

BACKGROUND

1. Field of the Invention

The present invention relates to child safety seats.

2. Description of the Related Art

Many booster seat products currently available on the market are sold as a combination of a booster seat with a removable backrest that is convertible to a booster seat having no backrest as the child grows. The legal age requirement for a child to be seated on a booster seat continues to increase, and current booster seats are rated for 10-year old children. At the age of 10, the child can be transported by different caregivers. For example, a parent may drop the child off at school, and another caregiver may pick up the child after school. Existing booster seats are usually large and bulky, which makes it difficult for the child to carry the booster seat, or requires the caregivers to purchase multiple booster seats.

Therefore, there is a need for an improved child safety seat that can be manufactured in a cost-effective manner, and address at least the foregoing issues.

SUMMARY

The present application describes a child safety seat that can be flexibly convertible to different configurations of use according to the age of a child. The child safety seat includes a seat base and a belt-positioning seat. The seat base has a bottom surface suitable for placement on a vehicle seat, two armrests protruding upward from an upper surface of the seat base, and a receiving region between the two armrests. The belt-positioning seat is installable in the receiving region of the seat base and removable from the seat base for independent use, the belt-positioning seat including a seat body having a bottom surface adapted to be placed on a vehicle seat, and a belt guide connected with the seat body, the belt guide having a deployed position protruding upward from the seat body and a storage position stowed in a storage cavity provided in the seat body, the belt-positioning seat being placed in the receiving region of the seat base with the belt guide in the storage position.

Moreover, the present application provides a belt-positioning seat that is incorporable into a child safety seat and detachable for independent use. The belt-positioning seat includes a seat body having a plate shape, a belt guide connected with the seat body, and a coupling structure connected with the seat body for attachment of the belt-positioning seat in a child safety seat. The seat body has a bottom surface adapted to be placed on a vehicle seat, and a belt guide connected with the seat body, the belt guide having a deployed position protruding upward from the seat body and a storage position stowed in a storage cavity provided in the seat body, the belt-positioning seat being incorporable into a child safety seat with the belt guide in the storage position.

DETAILED DESCRIPTION OF THE EMBODIMENTS

Figure 1:
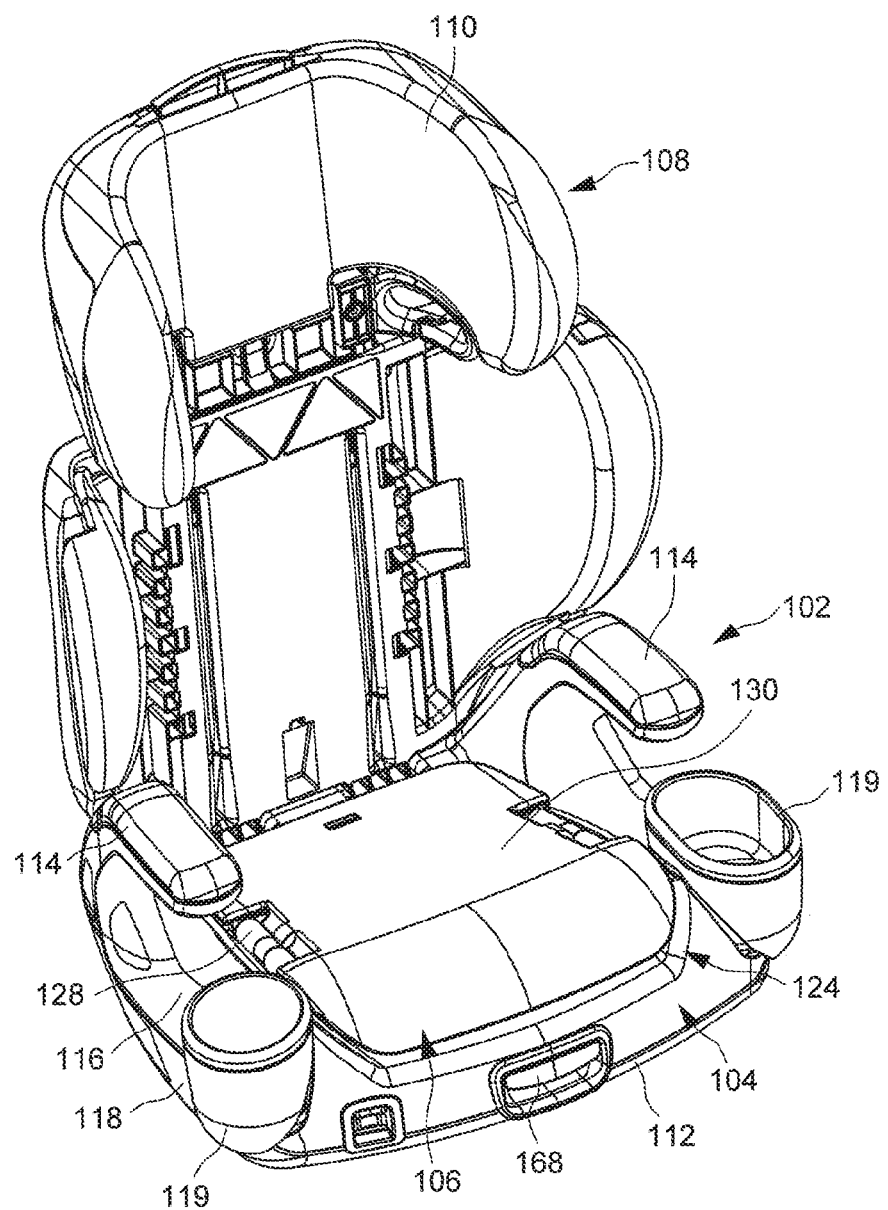
FIG. 1 is a front perspective view illustrating an embodiment of child safety seat including a seat base, a belt-positioning seat and a backrest.
Figure 2:
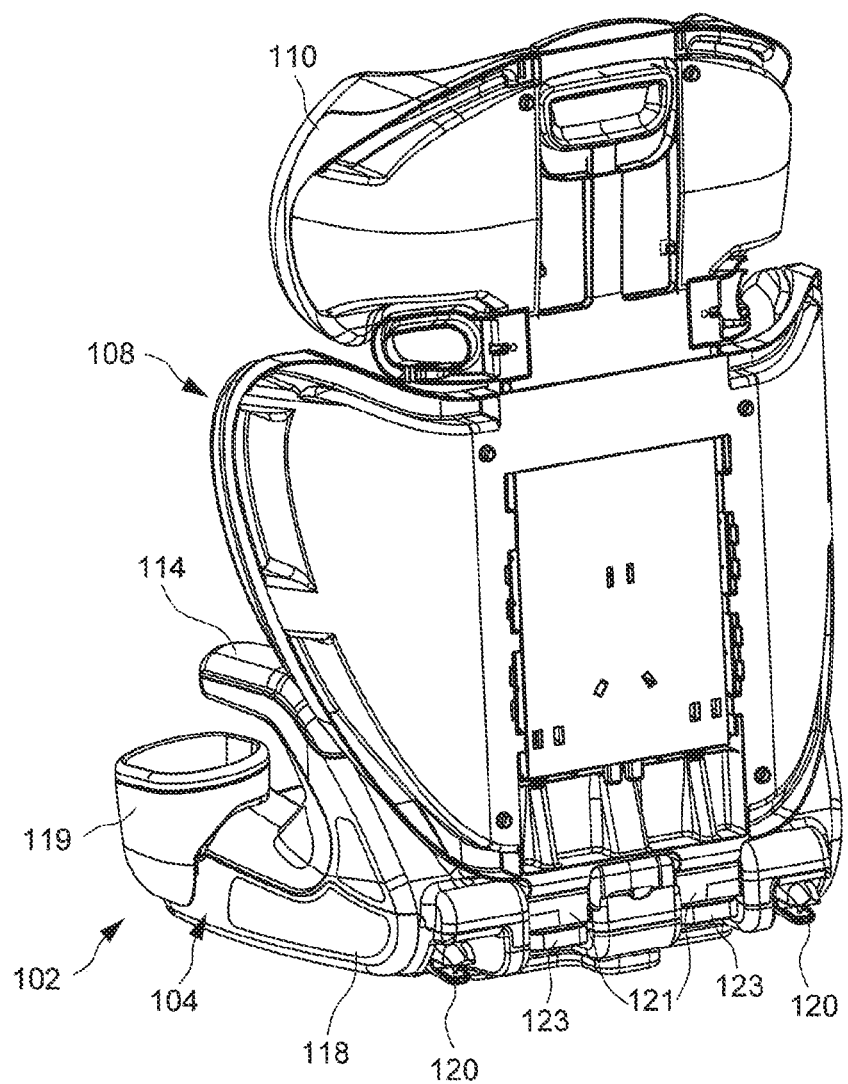
FIG. 2 is a rear perspective view of the child safety seat shown in FIG. 1.
Figure 3:
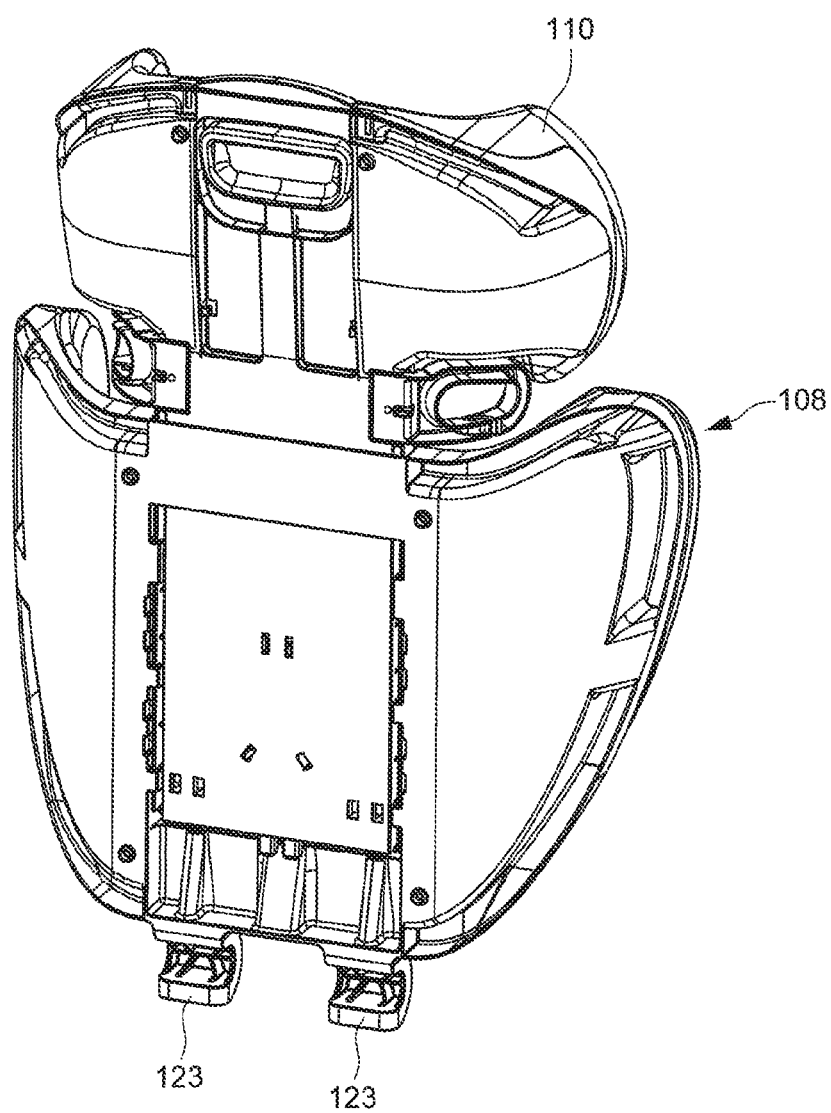
FIG. 3 is a perspective view illustrating the backrest alone.
Figure 4:
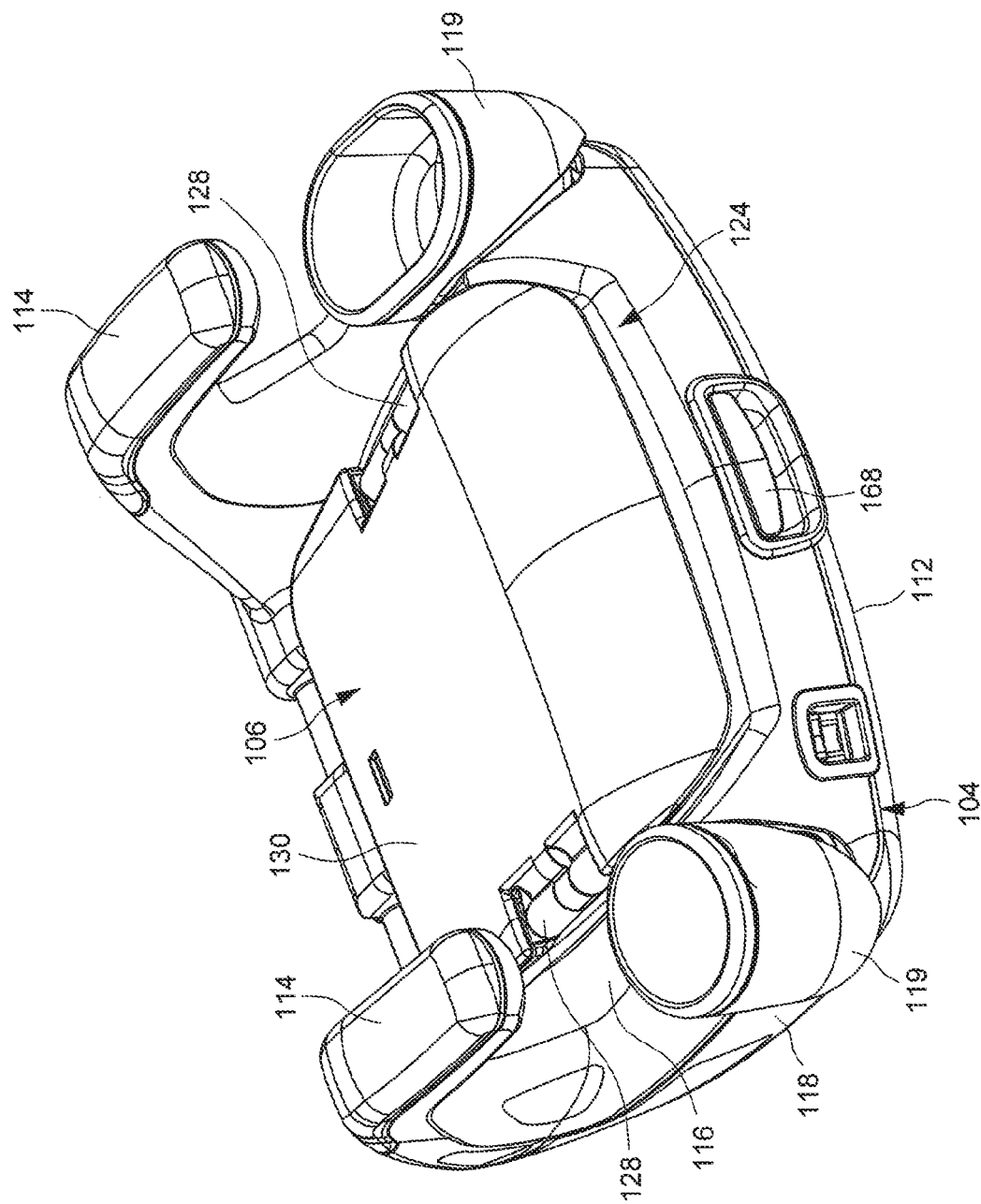
FIGS. 4 and 5 are a front and a rear perspective view illustrating the belt-positioning seat installed on the seat base to form a booster seat without the backrest.
Figure 5:
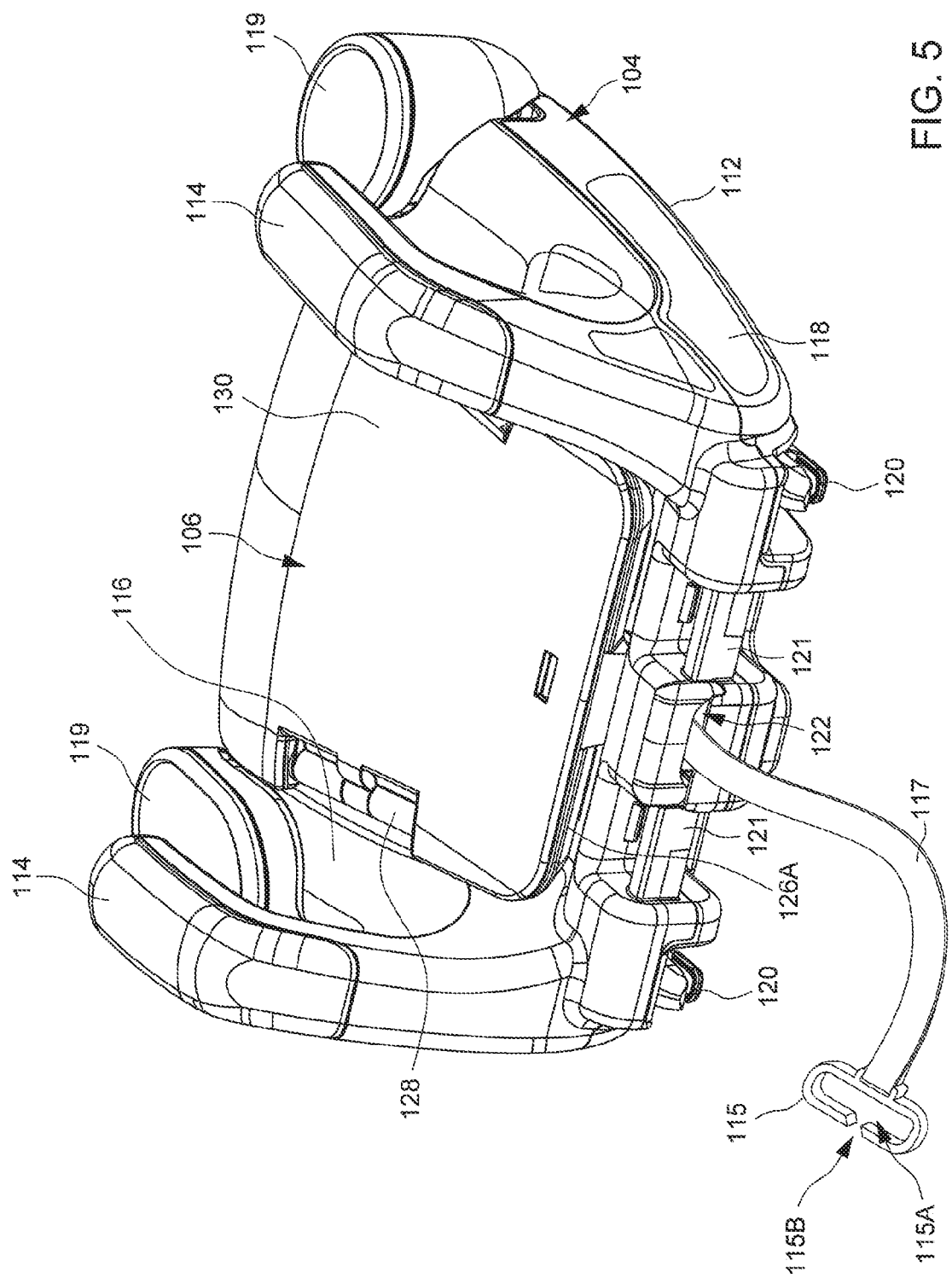
Figure 6:
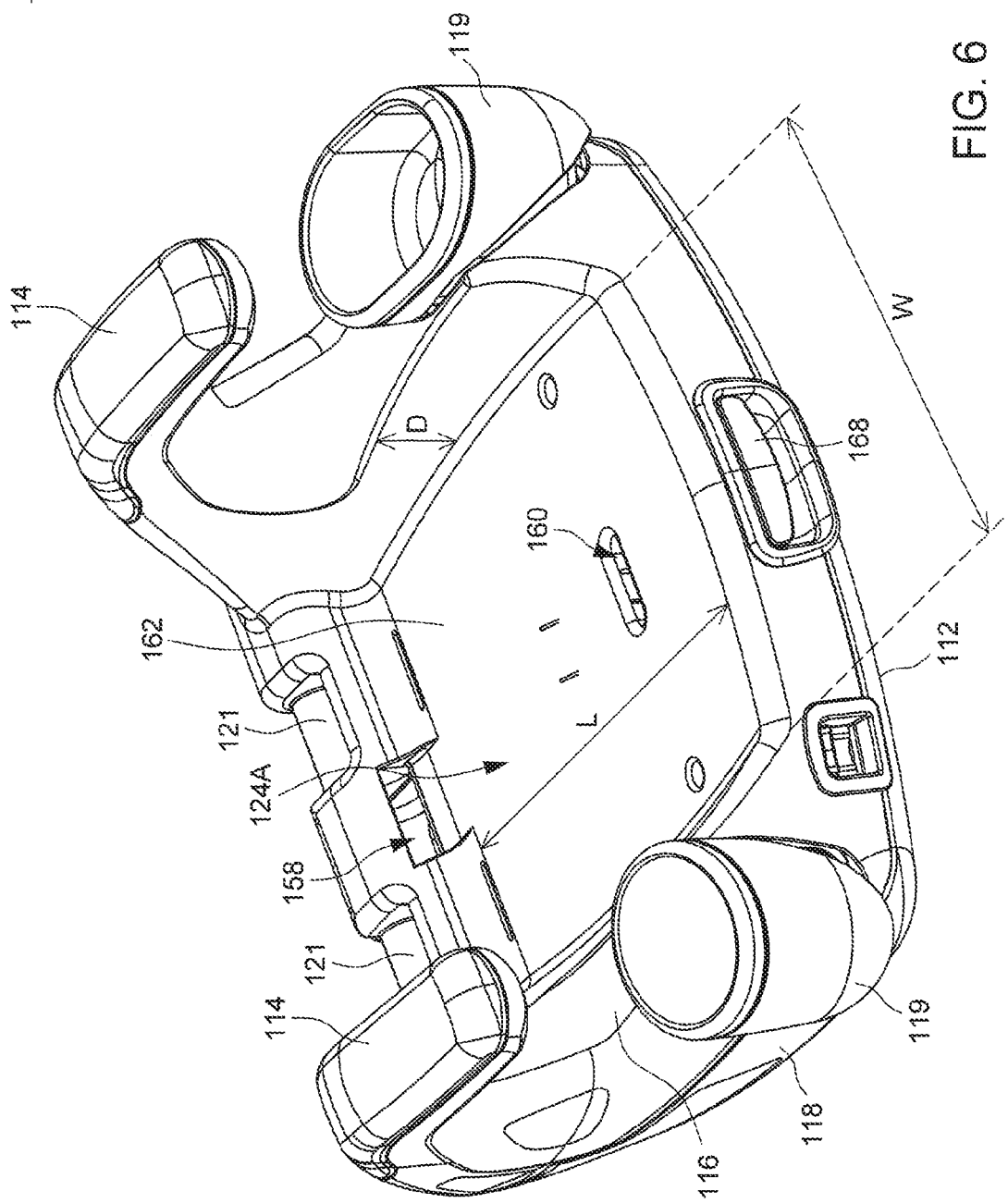
FIG. 6 is a perspective view illustrating the seat base alone.
Figure 7:
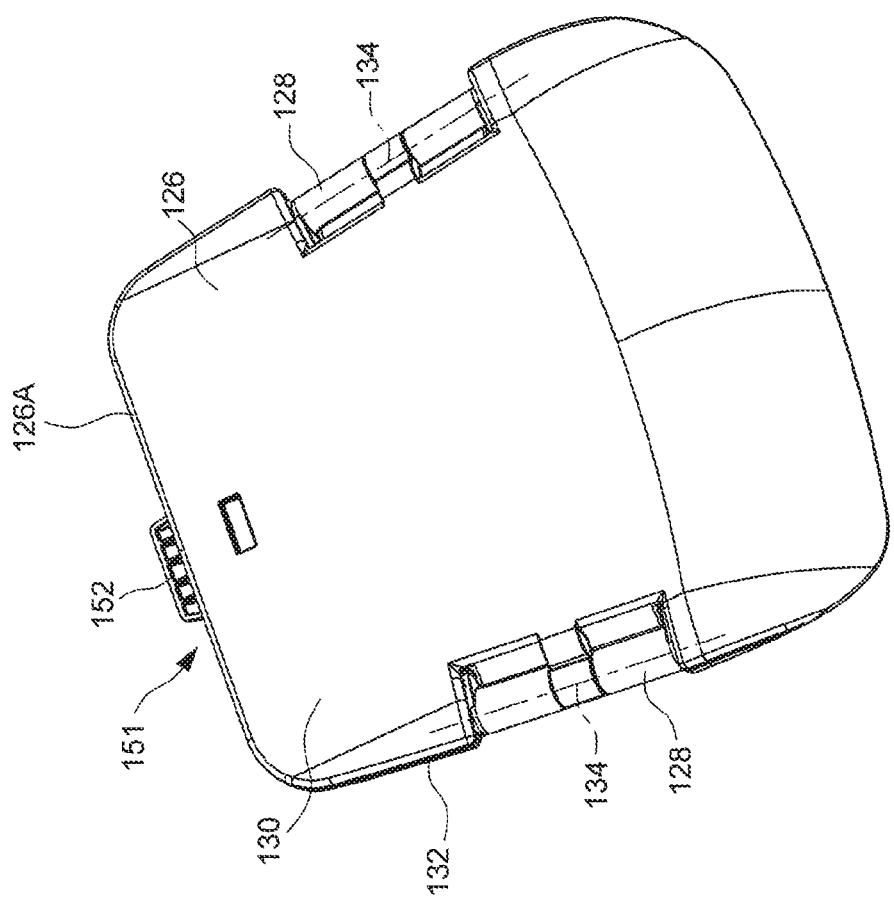
FIGS. 7-10 are perspective views illustrating the belt-positioning seat alone in different configurations.
Figure 9:
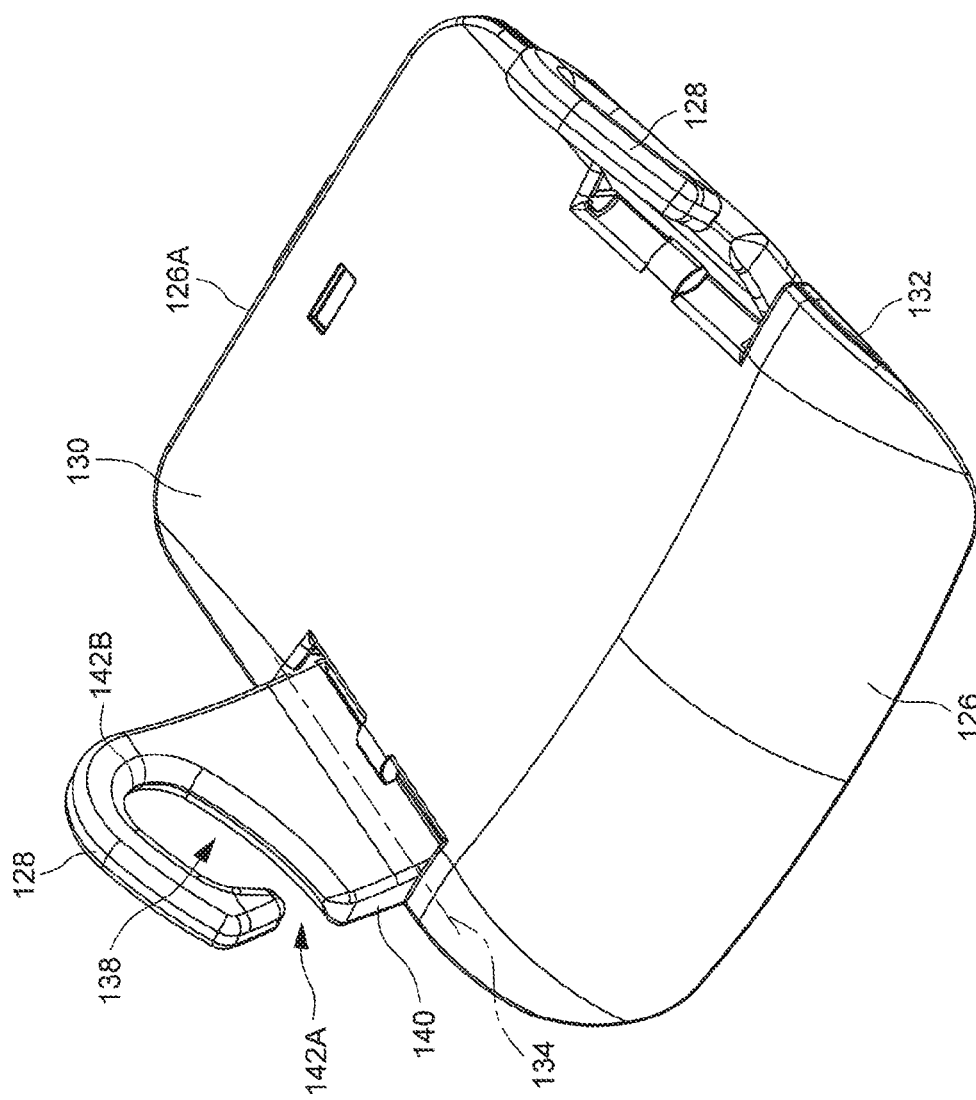
Figure 10:
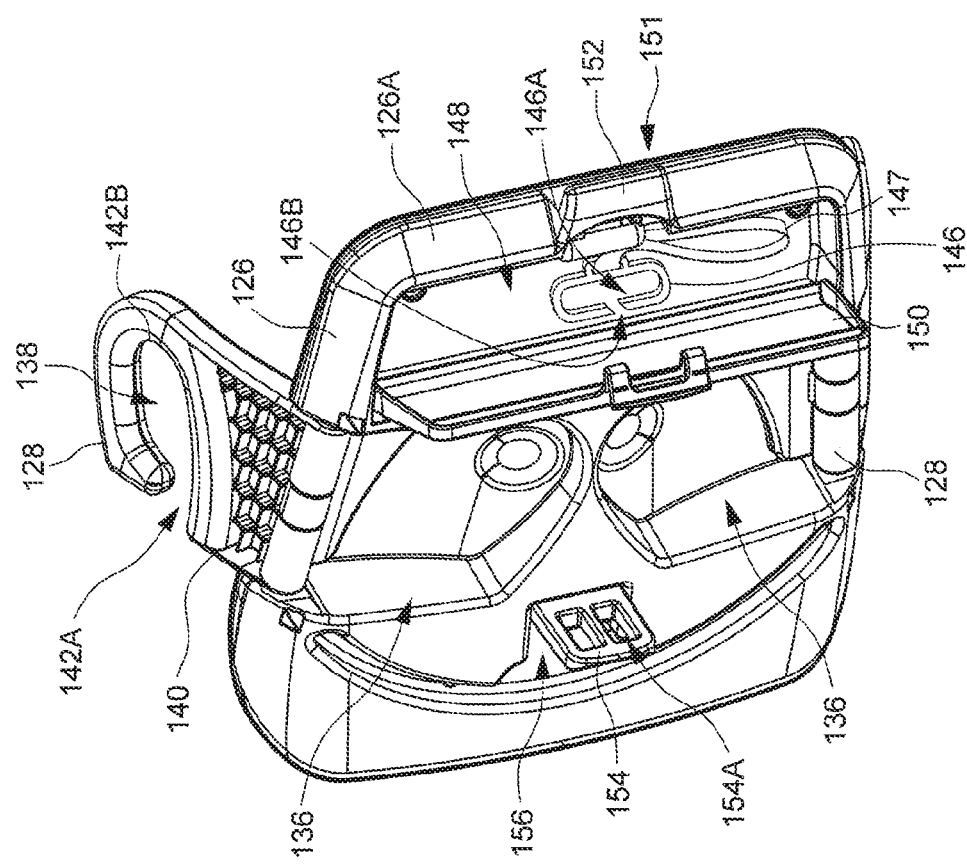
Figure 11:
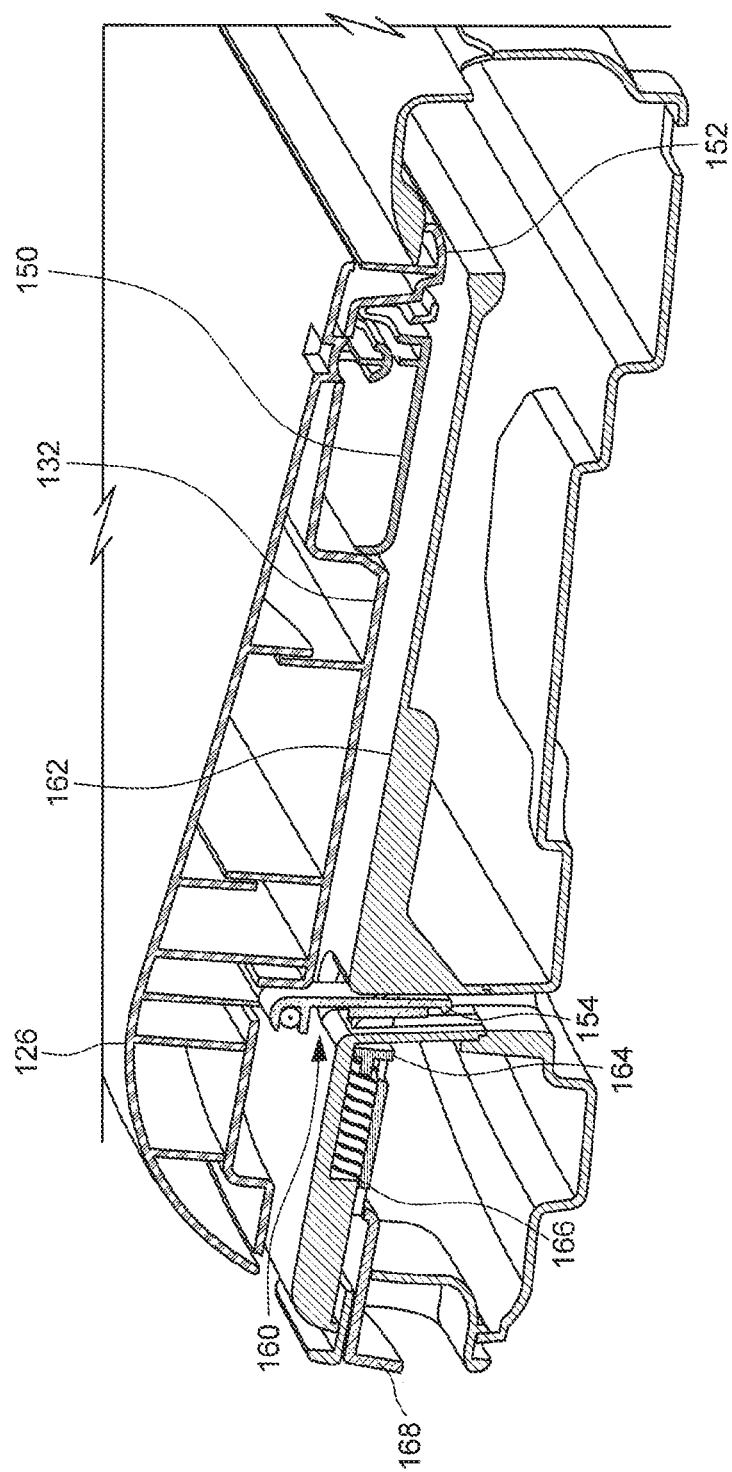
FIG. 11 is a cross-sectional view illustrating the belt-positioning seat assembled with the seat base.

FIGS. 1-11 are various schematic views illustrating an embodiment of a child safety seat 100. The child safety seat 100 can include a seat portion 102 comprised of a seat base 104 and a belt-positioning seat 106, and a backrest 108 having a headrest 110. The child safety seat 100 can have different configurations of use in accordance with the age of a child received thereon. For example, the backrest 108 can be attached to the seat base 104 for seating a child of younger age, and detached from the seat base 104 so that the seat base 104 and the belt-positioning seat 106 disposed thereon can form a booster seat for seating a child of older age. As the child further grows up, the belt-positioning seat 106 can be removed from the seat base 104 for independent use for seating a child on a vehicle seat. FIGS. 1 and 2 are a front and a rear perspective view illustrating the seat base 104, the belt-positioning seat 106 and the backrest 108 assembled to form the entire child safety seat 100. FIG. 3 is a perspective view illustrating the backrest 108 alone. FIGS. 4 and 5 are a front and a rear perspective view illustrating the belt-positioning seat 106 installed on the seat base 104 to form a booster seat without the backrest 108. FIG. 6 is a perspective view illustrating the seat base 104 alone. FIGS. 7-10 are perspective views illustrating the belt-positioning seat 106 alone. FIG. 11 is a partial cross-sectional view schematically illustrating the belt-positioning seat 106 assembled with the seat base 104.

Referring to FIGS. 1-6, the seat base 104 can have a bottom surface 112 suitable for placement on a vehicle seat, and two armrests 114 protruding upward from an upper surface 116 of the seat base 104. According to an example of construction, the seat base 104 may include, e.g., a rigid shell body 118, the bottom surface 112 and the upper surface 116 may be two opposite surfaces of the shell body 118, and the two armrests 114 can be fixedly connected with the shell body 118 at a left and a right side thereof. The shell body 118 and the armrests 114 may be made of a rigid material, which can include, without limitation, plastics. Moreover, a left and a right side of the shell body 118 may be respectively connected object containers 119, such as cup holders.

As better shown in FIGS. 2 and 5, a rear of the shell body 118 can include a plurality of connectors 120 for attachment to a fixed anchor structure provided on a vehicle seat. The connectors 120 can be, e.g., ISOFIX connectors. For attaching the backrest 108 to the seat base 104, the rear of the shell body 118 can further include one or more transversal bar(s) 121, and a lower end of the backrest 108 can include one or more clip(s) 123 operable to clamp the transversal bar(s) 121. The backrest 108 can be attached to the seat base 104 by engaging the clip(s) 123 with the transversal bar(s) 121, and detached from the seat base 104 by disengaging the clip(s) 123 from the transversal bar(s) 121.

Referring to FIG. 5, according to an embodiment, the seat base 104 can further include a belt positioner 115 that is coupled to the shell body 118 via a leash 117. The belt positioner 115 may have a belt hole 115A for passage of a belt, and a slit 115B for insertion of a belt into the belt hole 115A. In use, the belt positioner 115 may be coupled to a shoulder belt of a vehicle seatbelt. When it is not used, the belt positioner 115 may be detached from the shoulder belt of the vehicle seatbelt. The unused belt positioner 115 may be stored in a storage compartment 122 provided on the seat base 104. For example, the storage compartment 122 may be provided at a rear of the shell body 118 of the seat base 104.

Referring to FIGS. 1 and 4-6, the seat base 104 can have a receiving region 124 between the two armrests 114 configured to receive at least partially the belt-positioning seat 106. According to an example of construction, the receiving region 124 can include a positioning cavity 124A (better shown in FIG. 6) provided on the upper surface 116 of the seat base 104. The positioning cavity 124A may have dimensions that substantially match with those of the belt-positioning seat 106. For example, the positioning cavity 124A can have a width W substantially matched with a width of the belt-positioning seat 106, and a length L substantially matched with a length of the belt-positioning seat 106. Moreover, a depth D of the positioning cavity 124A can substantially match with a thickness of the belt-positioning seat 106. In this manner, the belt-positioning seat 106 can be snugly fitted in the positioning cavity 124A.

Figure 12:
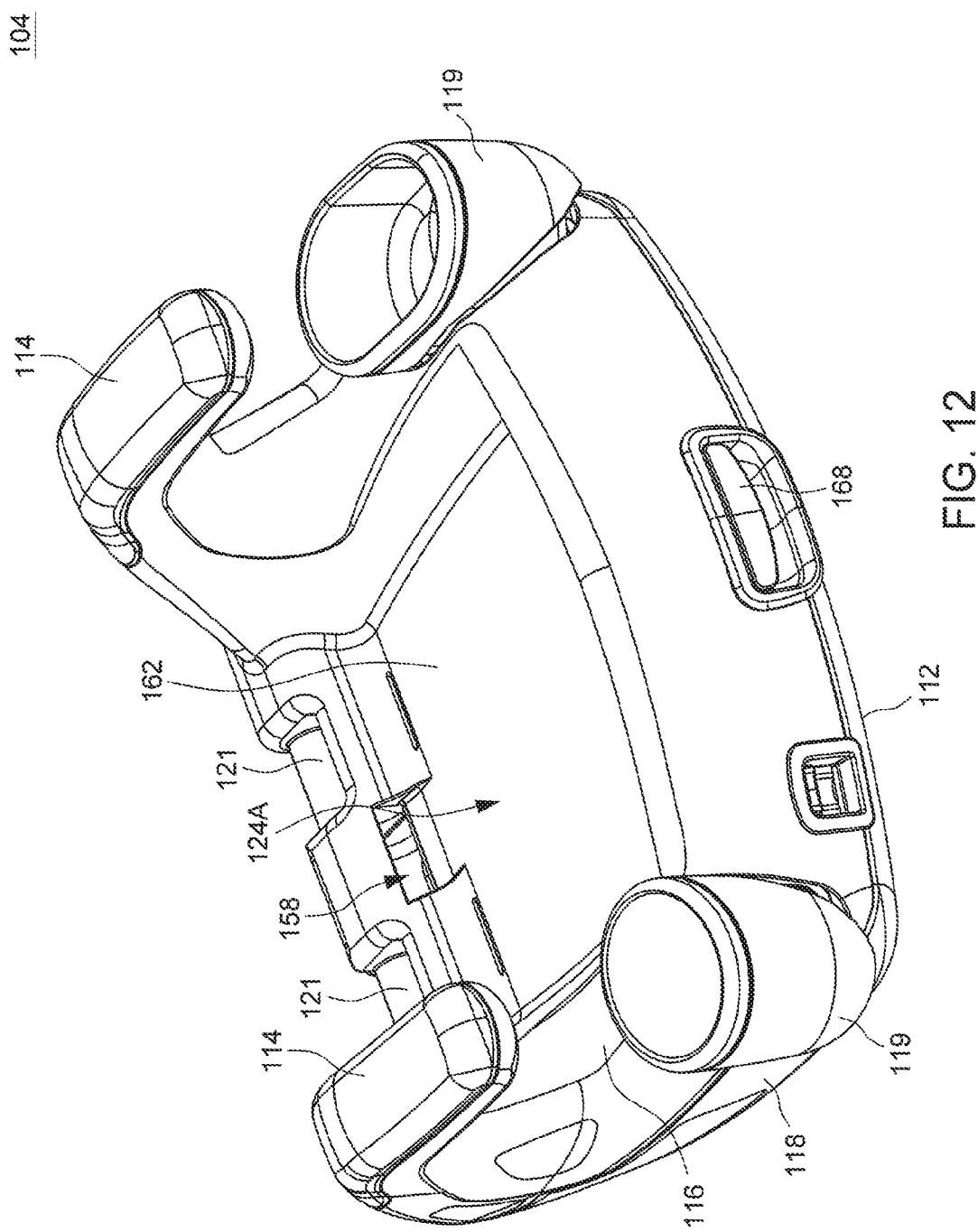
FIG. 12 is perspective view illustrating a variant construction of the seat base.

In the example illustrated in FIGS. 1 and 4-6, the positioning cavity 124A is opened at a front of the seat base 104, which can facilitate access to the interior of the positioning cavity 124A for removal and/or placement of the belt-positioning seat 106. It will be appreciated, however, that other configurations are possible. For example, FIG. 12 illustrates a variant construction of the seat base 104 in which the positioning cavity 124A may be entirely surrounded by sidewalls that prevent horizontal movements of the belt-positioning seat 106 in the positioning cavity 124A, so that the belt-positioning seat 106 can only be vertically installed in and removed from the positioning cavity 124A.

Referring to FIGS. 7-10, the belt-positioning seat 106 is installable in the receiving region 124 of the seat base 104, and removable from the seat base 104 for independent use for seating a child on a vehicle seat. According to an embodiment, the belt-positioning seat 106 can include a seat body 126 and two belt guides 128.

The seat body 126 can have an upper surface 130 on which a child can sit, and a bottom surface 132 adapted to be placed on a vehicle seat when the belt-positioning seat 106 is independently used. The seat body 126 can be compact in shape and size to facilitate its portability and placement in the receiving region 124 of the seat base 104. For example, the seat body 126 can have a plate shape having dimensions smaller than the seat base 104. According to an example of construction, the seat body 126 may be made of a rigid material, which may include, without limitation, plastics.

When the belt-positioning seat 106 is used independently on a vehicle seat, the two belt guides 128 are used for guiding the transversal passage of a restraining belt (e.g., a vehicle seatbelt). According to an embodiment, the two belt guides 128 can be respectively connected pivotally with a left and a right side of the seat body 126 about two pivot axes 134, which can be generally parallel to the left and right sides of the seat body 126. The belt guides 128 can be made of a rigid material, which can include, e.g., plastics, a metallic material, and the like. The belt guide 128 on each of the left and right side of the seat body 126 can rotate relative to the seat body 126 between a deployed position (shown in FIG. 9) where the belt guide 128 can protrude upward above the upper surface 130 of the seat body 126 for use, and a storage position (shown in FIG. 8) where the belt guide 128 can be stowed in a storage cavity 136 provided in the seat body 126. For example, the storage cavity 136 can be provided on the bottom surface 132 of the seat body 126, and the belt guide 128 is rotatable toward the bottom surface 132 to be received in the storage cavity 136. The belt-positioning seat 106 can be placed in the receiving region 124 of the seat base 104 with the two belt guides 128 in the storage position.

Figure 8:
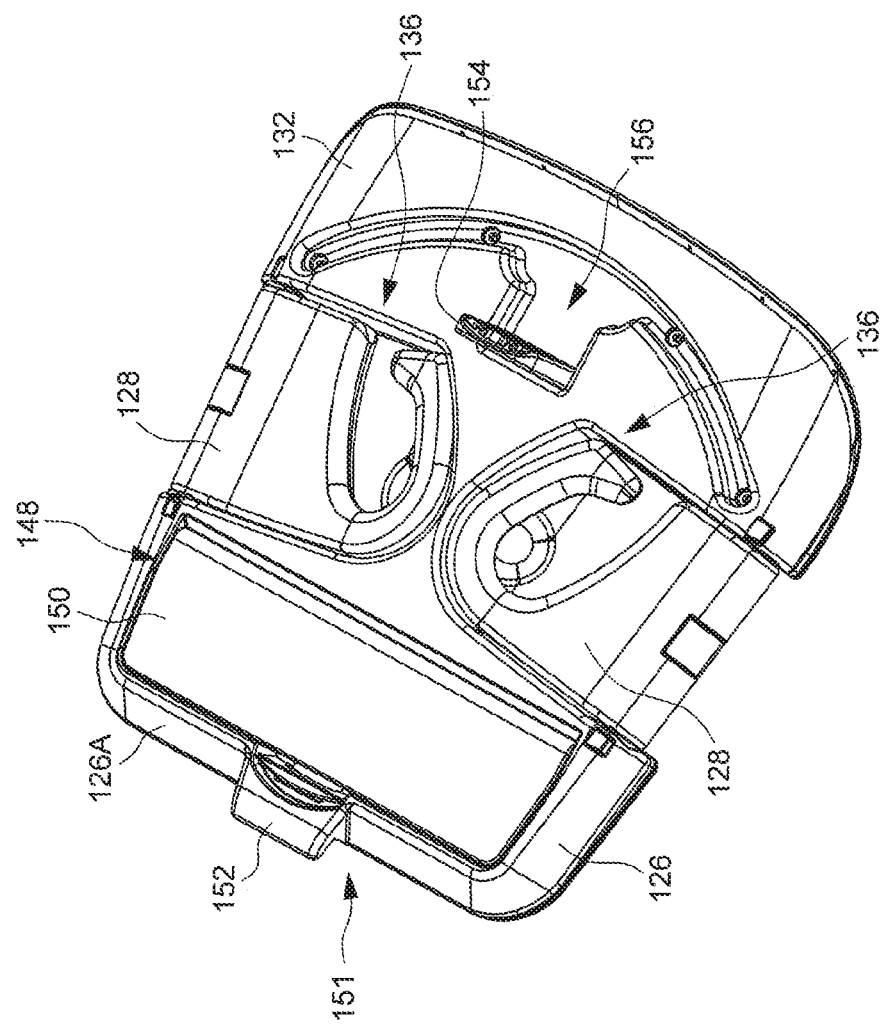

Referring to FIGS. 8-10, the two belt guides 128 can have a same structure. For example, each belt guide 128 can have a belt hole 138 configured to receive the placement of a restraining belt (e.g., a vehicle seatbelt). The belt hole 138 is disposed at a forward position relative to a rear end 126A of the seat body 126. A front edge 140 of the belt guide 128 can have a slit 142A for insertion of a restraining belt into the belt hole 138. The slit 142A is narrower than the belt hole 138 so that the belt hole 138 can restrict a restraining belt received therein. When the belt guide 128 is in the deployed position, the belt hole 138 may have an inclined profile, so that a rear end 142B of the belt hole 138 is positioned higher than the slit 142A and at a forward position relative to the rear end 126A of the seat body 126.

Figure 13:
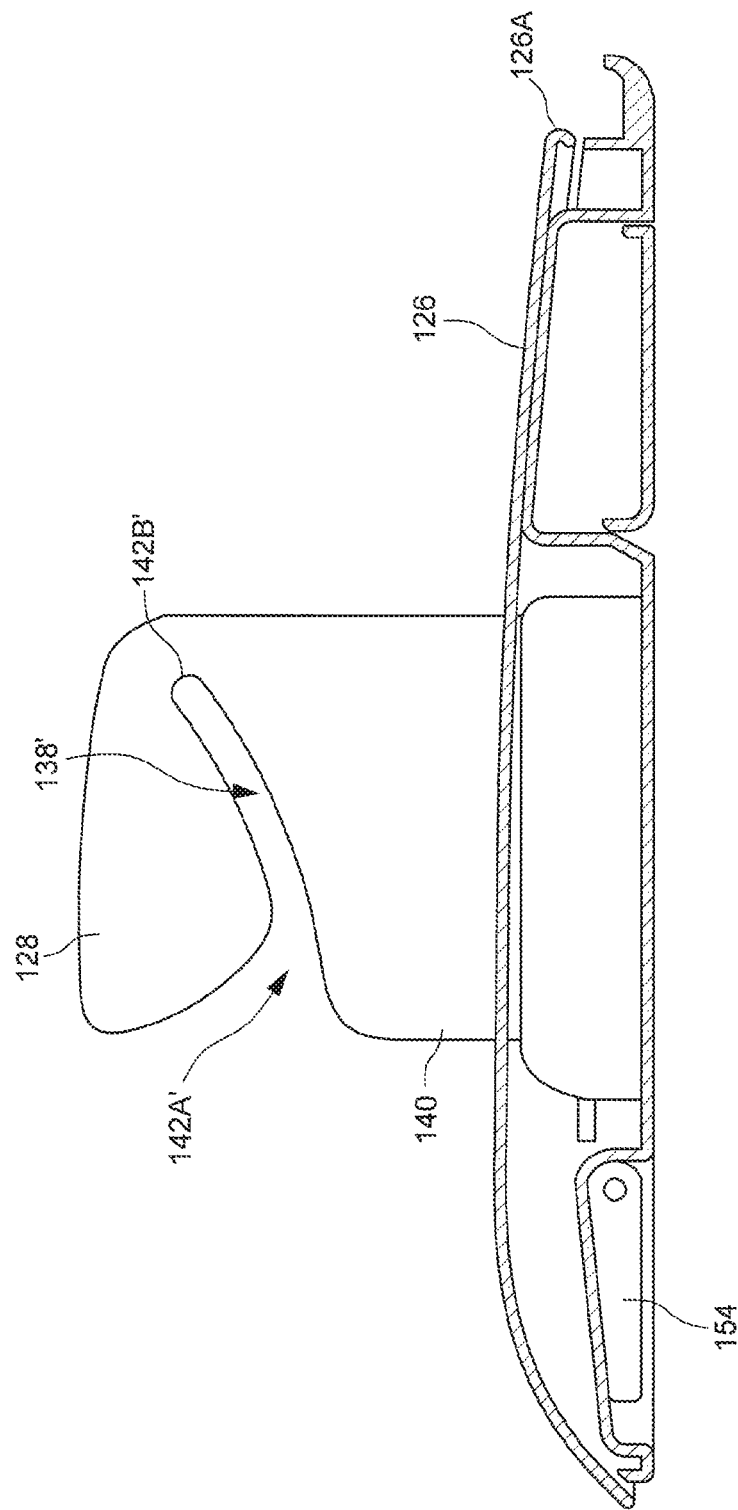
FIG. 13 is a schematic view illustrating another variant construction of a belt guide provided on the belt-positioning seat.

FIG. 13 is a schematic view illustrating another suitable construction of the belt guide 128. Rather than having the belt hole 138 described previously, the belt guide 128 shown in FIG. 13 can have a belt slot 138' configured to receive the placement of a restraining belt. The belt slot 138' can have a front opening 142A' on the front edge 140 of the belt guide 128, and a closed rear end 142B'. The belt slot 138' may be narrow so as to prevent twisting of a restraining belt placed therein. The front opening 142A' can have a tapered shape that is larger on the front edge 140 of the belt guide 128 and narrows toward an interior of the belt slot 138', thereby facilitating the insertion of a restraining belt. The rear end 142B' of the belt slot 138' can be located higher than the front opening 142A' and at a forward position relative to the rear end 126A of the seat body 126 when the belt guide 128 is in the deployed position.

During use, the two belt guides 128 can position a restraining belt forward and down onto the thighs of a child sitting on the belt-positioning seat 106. The restraining belt can thereby wrap across the child in a more suitable manner to provide effective protection.

Referring to FIG. 10, the belt-positioning seat 106 can further include a belt positioner 146 operable to couple to a restraining belt that is installed through the belt guides 128. The belt positioner 146 may be similar to belt positioner 115 of the seat base 104, and include a belt hole 146A for passage of a belt and a slit 146B for insertion of a belt into the belt hole 146A. Moreover, the belt positioner 146 may be coupled to the seat body 126 of the belt-positioning seat 106 via a leash 147, which may be exemplary a strap. In use, the belt positioner 146 is deployable outside the seat body 126 and coupled to a shoulder belt of a vehicle seatbelt. When it is unused, the belt positioner 146 may be detached from the shoulder belt of the vehicle seatbelt. The unused belt positioner 146 and the leash 147 may be placed in a storage compartment 148 provided in the seat body 126. The storage compartment 148 may be provided at a bottom of the seat body 126. A pivoting cover 150 connected with the seat body 126 may be operable to close and open the storage compartment 148.

Referring to FIGS. 6-10, the belt-positioning seat 106 can further include a coupling structure 151 for attaching the belt-positioning seat 106 to the seat base 104. According to an embodiment, the coupling structure 151 can include a catching portion 152 fixedly connected with the seat body 126 at an outer edge thereof, and a connector 154 coupled with the seat body 126. For example, the catching portion 152 can be fixedly connected with the rear end 126A of the seat body 126, and the connector 154 can be coupled with the seat body 126 at a forward position relative to the catching portion 152. According to an example of construction, the catching portion 152 may be formed as a protruding lip. According to an example of construction, the connector 154 may be provided as a unitary part movably connected with the seat body 126. For example, the connector 154 can be pivotally connected with the seat body 126, and is rotatable relative to the seat body 126 between a storage position where the connector 154 is stowed in the seat body 126 and a deployed position where the connector 154 protrudes downward from the bottom surface 132 of the seat body 126. According to an example of construction, the bottom surface 132 of the seat body 126 may include a cavity 156, and the connector 154 may be received at least partially in the cavity 156 in the storage position.

Referring to FIGS. 4-11, when the belt-positioning seat 106 is installed in the receiving region 124 of the seat base 104, the catching portion 152 can engage with a corresponding structure provided on the seat base 104. For example, the catching portion 152 may engage with an opening 158 (better shown in FIG. 6) provided on the seat base 104. The opening 158 may be exemplary formed through a rear sidewall of the positioning cavity 124A. Moreover, the connector 154 of the belt-positioning seat 106 protruding downward can be received at least partially in an anchoring slot 160 (better shown in FIG. 6) of the seat base 104. For example, the anchoring slot 160 may be opened on a major surface 162 of the positioning cavity 124A on which the belt-positioning seat 106 can be placed and supported. While the connector 154 is received at least partially in the anchoring slot 160, a latch 164 (better shown in FIG. 11) provided in the seat base 104 can engage with the connector 154 so as to retain the belt-positioning seat 106 with the seat base 104.

Referring to FIGS. 6 and 11, the latch 164 is movably assembled with the shell body 118 of the seat base 104. For example, the latch 164 may be slidably connected with the shell body 118, so that the latch 164 can slide rearward to engage with an opening 154A (better shown in FIG. 10) provided on the connector 154 and slide forward to disengage from the connector 154. Moreover, the seat base 104 can include a spring 166 and a release part 168 respectively connected with the latch 164. The spring 166 can have two ends respectively connected with the shell body 118 of the seat base 104 and the latch 164. The release part 168 can be exposed on a front of the seat base 104, and can be slidably connected with the shell body 118. The release part 168 is operable to urge the latch 164 to move for disengaging from the connector 154 for removal of the belt-positioning seat 106 from the seat base 104.

Exemplary operations for converting the child safety seat 100 to different configurations of use are described hereinafter with reference to FIGS. 1-11. For seating a child of young age, the backrest 108 can be attached to the seat base 104 by engaging the clip 123 of the backrest 108 with the transversal bar 121 provided on the seat base 104. Moreover, the belt-positioning seat 106 can be installed on the seat base 104 with the belt guides 128 in the storage position. The installation of the belt-positioning seat 106 can include engaging the catching portion 152 of the belt-positioning seat 106 with the opening 158 in the seat base 104, and rotating the belt-positioning seat 106 toward the positioning cavity 124A with the connector 154 protruding downward until the belt-positioning seat 106 is positioned in the positioning cavity 124A and the connector 154 received in the anchoring slot 160 of the seat base 104. As the connector 154 inserts into the anchoring slot 160, the latch 164 biased by the spring 166 can engage the connector 154. The respective engagements of the latch 164 with the connector 154 and the catching portion 152 with the opening 158 can lock the belt-positioning seat 106 in position. The assembly of the seat base 104, the belt-positioning seat 106 and the backrest 108 can thereby form the child safety seat 100 shown in FIGS. 1 and 2, which can receive a child sitting on the belt-positioning seat 106.

For seating a child of older age, the backrest 108 can be removed from the seat base 104, while the belt-positioning seat 106 remains attached to the seat base 104. The seat base 104 and the belt-positioning seat 106 can thereby form a booster seat having no backrest shown in FIGS. 4 and 5, which can receive a child siting on the belt-positioning seat 106.

As the child grows older, the belt-positioning seat 106 can be removed from the seat base 104 and used independently for seating the child on a vehicle seat. For removing the belt-positioning seat 106 from the seat base 104, the release part 168 can be actuated so that the latch 164 is urged to move for disengaging from the connector 154. The belt-positioning seat 106 then can be removed from the seat base 104. The belt-positioning seat 106 detached from the seat base 104 can be installed on a vehicle seat with the bottom surface 132 of the seat body 126 contacting with the vehicle seat. The connector 154 can be in its storage position received in the cavity 156 while the belt-positioning seat 106 rests on the vehicle seat. After a child sits on the upper surface 130 of the seat body 126 between the two belt guides 128, a vehicle seatbelt can be installed so as to extend through the belt guides 128 protruding upward from the upper surface 130 and wrap across the child's body, and the belt positioner 146 deployed outward can be coupled to the shoulder belt of the vehicle seatbelt. The belt guides 128 can freely rotate to adapt to the size of the child sitting on the upper surface 130 between the two belt guides 128. For example, a range of adjustment for each belt guide 128 can include, without limitation, an angular range of about 60 degrees defined between a vertical position where the belt guide 128 rises upward generally perpendicular to the seat body 126 and an outward inclined position where the belt guide 128 is tilted outward about 60 degrees from the vertical position.

Figure 14:
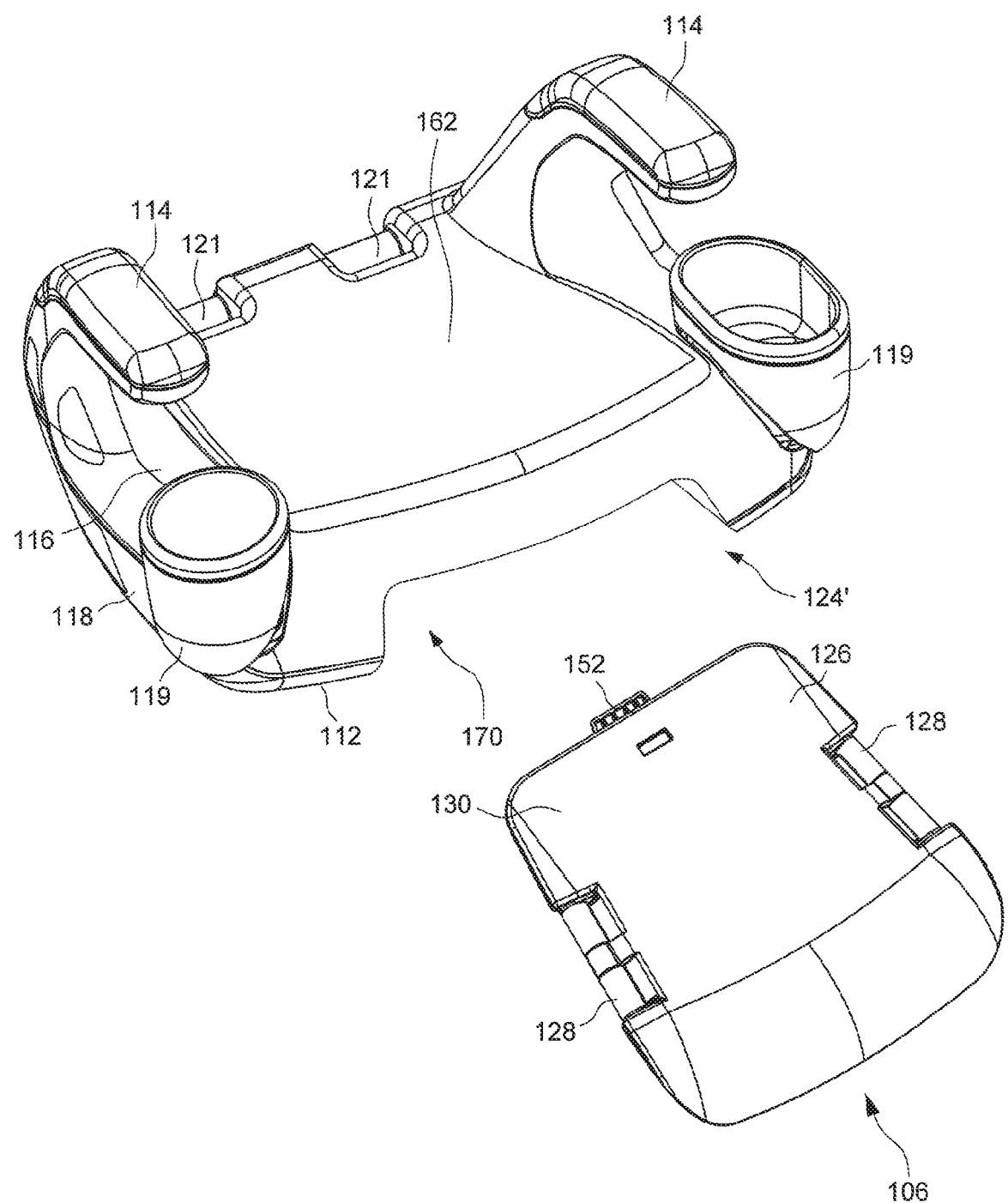
FIG. 14 is a perspective view illustrating a variant configuration of positioning the belt-positioning seat in the seat base.

The aforementioned embodiment provides a configuration in which the belt-positioning seat 106 installed on the seat base 104 can serve as a sitting support. It will be appreciated, however, that other configurations may be possible. FIG. 14 is a perspective view illustrating another example in which the receiving region 124' for placement of the belt-positioning seat 106 can include a cavity 170 that is provided at an underside of the seat base 104 and between the two armrests 114. The belt-positioning seat 106 when unused can be stored in the cavity 170. In the example of FIG. 14, a child can directly sit on the upper surface of the seat base 104 when the seat base 104 is used for seating a child on a vehicle seat.

Advantages of the structures described herein include the ability to provide a child safety seat convertible to different configurations of use according to the age of the child. The child safety seat can include a seat base, a backrest and a belt-positioning seat that can be assembled together to form a complete child safety seat or detached for independent use, which can offer more flexibility and expand the service life of the child safety seat.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A belt-positioning seat incorporable into a child safety seat and detachable for independent use, the belt-positioning seat comprising:
   a seat body having a plate shape, the seat body having a bottom surface adapted to be placed on a vehicle seat; and
   a belt guide connected with the seat body, the belt guide having a deployed position protruding upward from the seat body and a storage position stowed in a storage cavity provided in the seat body, the belt-positioning seat being incorporable into a child safety seat with the belt guide in the storage position;
   wherein the belt guide is pivotally connected with the seat body; and
   wherein the storage cavity is provided on the bottom surface of the seat body, and the belt guide is rotatable toward the bottom surface to be received in the storage cavity.

2. The belt-positioning seat according to claim 1, wherein the belt guide includes a belt slot configured to receive the placement of a restraining belt, the belt slot having a front opening on a front edge of the belt guide for insertion of a restraining belt into the belt slot, the front opening having a tapered shape that is larger on the front edge and narrows toward an interior of the belt slot.

3. The belt-positioning seat according to claim 2, wherein the belt slot further has a rear end, the rear end of the belt slot being located higher than the front opening when the belt guide is in the deployed position.

4. The belt-positioning seat according to claim 1, wherein the belt guide includes a belt hole for passage of a restraining belt, a front edge of the belt guide having a slit for insertion of a restraining belt into the belt hole.

5. The belt-positioning seat according to claim 1, further comprising a coupling structure connected with the seat body for attachment of the belt-positioning seat in a child safety seat, wherein the coupling structure comprises a connector pivotally connected with the seat body for attachment to a seat base of a child safety seat, the connector being rotatable between a storage position where the connector is stowed in the seat body and a deployed position where the connector protrudes downward from the bottom surface of the seat body.

6. The belt-positioning seat according to claim 1, further comprising a coupling structure connected with the seat body for attachment of the belt-positioning seat in a child safety seat, wherein the coupling structure comprises a catching portion fixedly connected with the seat body at an outer edge thereof.

7. The belt-positioning seat according to claim 1, further comprising a coupling structure connected with the seat body for attachment of the belt-positioning seat in a child safety seat, wherein the coupling structure comprises a catching portion fixedly connected with the seat body, and a connector pivotally connected with the seat body, the belt-positioning seat being installable on a seat base of a child safety seat with the catching portion engaged with the seat base and the connector protruding downward and received at least partially in an anchoring slot provided on the seat base.

8. The belt-positioning seat according to claim 7, wherein the catching portion is fixedly connected with the seat body at a rear end thereof.

9. The belt-positioning seat according to claim 1, further comprising a belt positioner operable to couple to a belt installed through the belt guide, the belt positioner being positionable in a storage compartment provided in the seat body and deployable outside the seat body for use.

10. The belt-positioning seat according to claim 1, wherein the belt guide is pivotally connected with the seat body about a pivot axis that is generally parallel to a side of the seat body.

11. A belt-positioning seat comprising:
    a seat body having a plate shape, the seat body having a bottom surface adapted to be placed on a vehicle seat; and
    a belt guide pivotally connected with the seat body about a lengthwise fore and aft extending pivot axis, the belt guide having a deployed position protruding upward from the seat body and a storage position rotated about the pivot axis and stowed in a storage cavity provided in the seat body, wherein the storage cavity is provided on the bottom surface of the seat body.

12. The belt-positioning seat according to claim 11, further comprising a belt positioner operable to couple to a belt installed through the belt guide, the belt positioner being positionable in a storage compartment provided in the seat body and the belt positioner deployable outside the seat body for use.

13. The belt-positioning seat according to claim 12, wherein the belt positioner is operable to couple to a shoulder belt of a vehicle seatbelt.

* * * * *